(12) United States Patent
Tarchinski

(10) Patent No.: US 7,402,068 B1
(45) Date of Patent: Jul. 22, 2008

(54) HIGH VOLTAGE INTERLOCK CONNECTION

(75) Inventor: James E. Tarchinski, Rochester Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/748,185

(22) Filed: May 14, 2007

(51) Int. Cl.
*H01R 13/627* (2006.01)
(52) U.S. Cl. ............... 439/350; 439/923; 439/357
(58) Field of Classification Search ........... 439/350, 439/357, 436, 923
See application file for complete search history.

(56) References Cited

U.S. PATENT DOCUMENTS

| | | | | |
|---|---|---|---|---|
| 4,946,404 A | * | 8/1990 | Takenouchi et al. | 439/352 |
| 5,203,719 A | * | 4/1993 | Kozono | 439/489 |
| 5,342,215 A | * | 8/1994 | Silbernagel et al. | 439/357 |
| 5,692,923 A | * | 12/1997 | Sawada | 439/555 |
| 6,139,351 A | * | 10/2000 | Schaefer et al. | 439/372 |
| 6,364,686 B2 | * | 4/2002 | Gimbel | 439/357 |
| 7,025,618 B2 | * | 4/2006 | Fukuda | 439/353 |
| 7,084,361 B1 | | 8/2006 | Bowes et al. | |
| 7,311,544 B1 | * | 12/2007 | Berta et al. | 439/344 |

* cited by examiner

*Primary Examiner*—Tho D Ta

(57) ABSTRACT

An interlock connection is provided for use in conjunction with a high voltage electrical system. The interlock connection includes a male portion, a resilient member, and a female portion adapted to receive the male portion therein. The female portion includes an access hole through which the resilient member is accessible when the male portion is received in the female portion. The resilient member is coupled to the male portion and configured to engage the female portion to prevent disconnection of the male portion from the female portion until the resilient member is deformed.

18 Claims, 2 Drawing Sheets

HIGH VOLTAGE INTERLOCK CONNECTION

TECHNICAL FIELD

The present invention generally relates to vehicular electrical systems and, more particularly, to a high voltage interlock connection particularly suited for use onboard a hybrid, electric, or fuel cell vehicle.

BACKGROUND OF THE INVENTION

Hybrid, electric, and fuel cell vehicles generally employ a high voltage electrical system, which includes at least one high voltage power source, such as a battery, a fuel cell, a generator, or the like. Before a person (e.g., a technician) may make physical contact with a current-carrying component of the electrical system (e.g., the interlock connection terminals), the high voltage power source should be disconnected and any localized electrical energy discharged. For this reason, the high voltage electrical system may employ a high voltage interlock (HVIL) control circuit that initiates discharge (or disconnection) of the power source when attempted access to the interlock connection terminals is detected.

After an HVIL control circuit has initiated discharge of the high voltage power source, a few seconds may elapse before the high voltage power source is sufficiently discharged. It thus becomes desirable to equip a high voltage electrical system with at least one mechanical barrier (referred to herein as a time-delay feature) that prevents a technician from accessing the interlock connection terminals until discharge is complete. For example, one high voltage connection system employs a threaded fastener, which secures an access cover to a high voltage device. The threaded fastener is covered by a shroud, which is electrically coupled to an HVIL control circuit. To disconnect the threaded fastener and remove the access cover, a technician first moves the shroud to an open position. This is detected by the HVIL control circuit, which initiates disconnection and discharge of the high voltage power source. A few seconds elapse as the technician removes the threaded fastener thereby permitting the power source time to discharge to an acceptable level before the access cover is removed.

Although high voltage connection systems employing conventional time-delay features are generally effective, they are still limited in certain respects. For example, high voltage connection systems of the type described above (i.e., systems employing a threaded fastener to secure an access cover) do not require reinstallation of the fastener to reconnect the high voltage interlock connection. As a result, a technician may not reinstall the threaded fastener after servicing, which may render the time-delay feature ineffective when the high voltage terminals are again accessed at a later time.

It should thus be appreciated that it would be desirable to provide a high voltage connection system employing a time-delay feature that prevents access to the interlock connection terminals until the high voltage power source is substantially discharged. It would further be desirable if such a high voltage connection system required reinstallation of the time-delay feature to reconnect the interlock connection. Other desirable features and characteristics of the present invention will become apparent from the subsequent detailed description and the appended claims, taken in conjunction with the accompanying drawings and the foregoing technical field and background.

SUMMARY OF THE INVENTION

An interlock connection is provided for use in conjunction with a high voltage electrical system. The interlock connection includes a male portion, a resilient member, and a female portion adapted to receive the male portion therein. The female portion includes an access hole through which the resilient member is accessible when the male portion is received in the female portion. The resilient member is coupled to the male portion and configured to engage the female portion to prevent disconnection of the male portion from the female portion until the resilient member is deformed.

DESCRIPTION OF THE DRAWINGS

The present invention will hereinafter be described in conjunction with the following drawing figures, wherein like numerals denote like elements, and.

DESCRIPTION OF AT LEAST ONE EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary, or the following detailed description.

Figure 1:
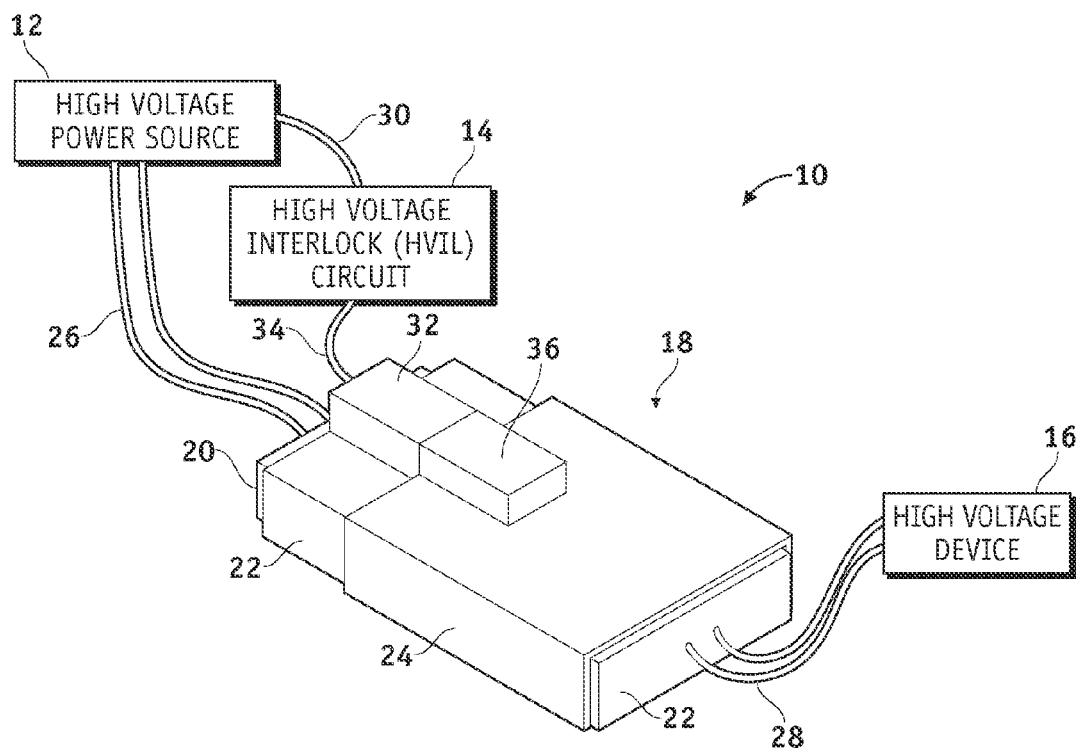
FIG. 1 is an isometric view of a generalized high voltage connection system having an interlock connection in accordance with an exemplary embodiment of the present invention.

FIG. 1 is an isometric view of a generalized high voltage connection system 10, which may be deployed on a vehicle (e.g., a hybrid, electric, or fuel cell vehicle) in accordance with a first exemplary embodiment of the present invention. High voltage connection system 10 includes a high voltage interlock (HVIL) circuit 14 and at least one interlock connection 18. High voltage connection system 10 electrically couples a high voltage power source 12 and to at least one high voltage device 16. By way of example, high voltage power source 12 may take the form of a battery, a fuel cell, a generator, or the like; and high voltage device 16 may take the form of an electric motor controller.

Figure 2:
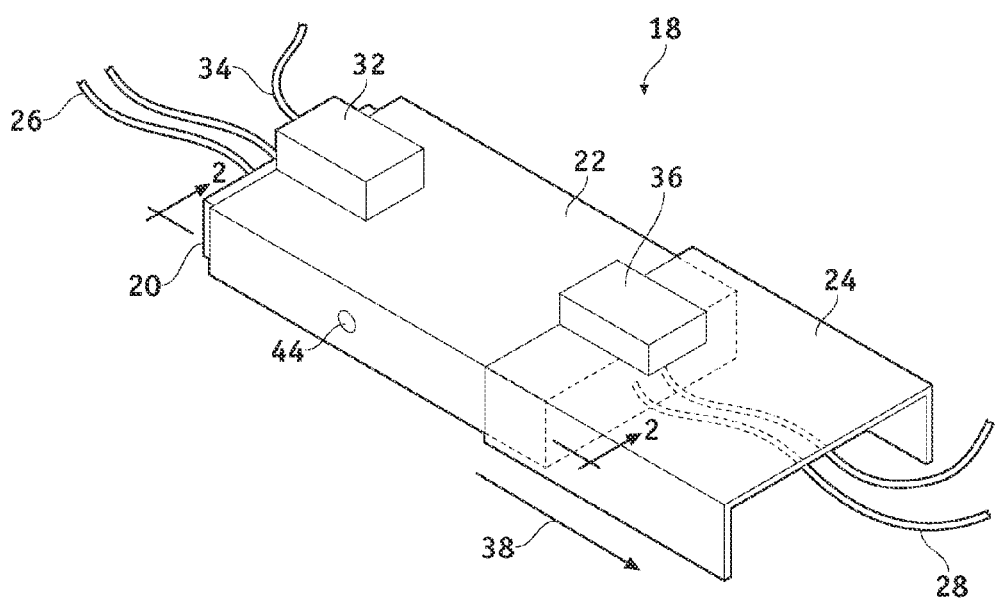
FIG. 2 is an isometric view of the interlock connection shown in FIG. 1 after the cover has been moved to an open position.

Interlock connection 18 may include a male portion 20, a female portion 22, and a cover 24; however, it should be understood that interlock connection 18 may assume any form suitable for connecting high voltage terminals (e.g., a bulkhead connector). Interlock connection 18 is electrically coupled between high voltage power source 12 and high voltage device 16. In the illustrated exemplary embodiment, male portion 20 is electrically connected to high voltage power source 12 by way of wires 26, and female portion 22 is electrically coupled to high voltage device 16 by way of wires 28. Interlock connection 18 is also electrically coupled to HVIL circuit 14, which is, in turn, operatively coupled to high voltage power source 12 via control signal line (e.g., serial data line) 30. For example, a HVIL terminal 32 may be mounted on female portion 22 and electrically coupled to HVIL circuit 14 via wire 34. In addition, a shorting plug 36 may be mounted on cover 24 and engage terminal 32 when cover 24 is in the closed position (shown in FIG. 1). HVIL circuit 14 electrically monitors terminal 32 to determine when shorting plug 36 has been disconnected from terminal 32 and, therefore, when cover 24 has been moved from the closed position to an open position as shown in FIG. 2 (described below). This example notwithstanding, HVIL circuit 14 may be coupled to interlock connection 18 in any manner suitable for determining when cover 24 is moved to an open position.

Before servicing high voltage device 16 or another component of high voltage connection system 10, a technician first disconnects interlock connection 18. HVIL circuit 14 is configured to detect attempted access to interlock connection 18 by monitoring the position of cover 24 and to initiate the discharge (or disconnection) of high voltage power source 12 when cover 24 is moved from the closed position. However, as explained previously, either the high voltage power source 12 or the high voltage device 16 may require a few seconds to disconnect or to discharge stored electrical energy. For this reason, interlock connection 18 is provided with at least one time-delay feature, which physically impedes the disconnection of interlock connection 18. In this manner, interlock connection 18 precludes physical contact with the high voltage terminals contained within interlock connection 18 until high voltage power source 12 is sufficiently removed from the electrical circuit.

When disconnecting interlock connection 18, a technician first moves cover 24 from the closed position to an open position. FIG. 2 is an isometric view of interlock connection 18 after cover 24 has been moved to an open position. This results in the disconnection of shorting plug 36 from HVIL terminal 32. The disconnection is detected by HVIL circuit 14 (FIG. 1), which commences disconnection of high voltage power source 12 and discharge of any significant stored electrical energy from the system. To move cover 24 to the open position, the technician may simply slide cover 24 in the direction indicated by arrow 38. Cover 24 may be retained at an end portion of female portion 22 or, instead, removed and set aside.

Figure 3:
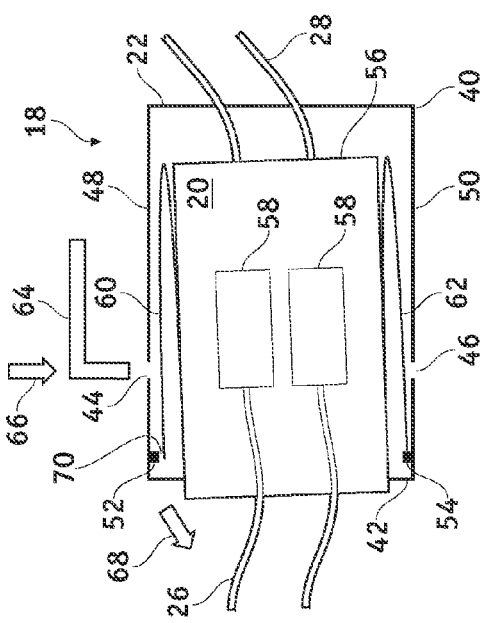
FIG. 3 is a cross-sectional view of the interlock connection shown FIG. 2 taken along line 2-2.

FIG. 3 is a cross-sectional view of interlock connection 18 taken along line 2-2 (FIG. 2) and having cover 24 removed for clarity. In this view, it can be seen that female portion 22 comprises a housing 40 (e.g., plastic) having a cavity therein and an open end 42. Male portion 20 is inserted into the cavity of housing 40 through open end 42. At least one access hole is provided through a wall of housing 40. For example, as shown in FIG. 3, first and second access holes 44 and 46 may be provided through opposing walls 48 and 50, respectively, of housing 40. Housing 40 also includes at least one retaining feature therein; e.g., housing 40 may include first and second retaining features (e.g., projections) 52 and 54, which are disposed on an interior surface of walls 48 and 50, respectively, proximate open end 42. Retaining features 52 and 54 are preferably disposed proximate access holes 44 and 46, respectively.

Male portion 20 of interlock connector 18 comprises a housing 56, which carries terminals 58. At least one resilient member is coupled to the exterior of housing 56. In the illustrated exemplary embodiment, in particular, first and second spring clips 60 and 62 are mounted on opposite walls of housing 56. When male portion 20 is received within female portion 22 as shown in FIGS. 2 and 3, spring clips 60 and 62 protrude outwardly from housing 56. If a technician (or other person) attempts to pull male portion 20 from female portion 22, springs clips 60 and 62 abuttingly engage retaining features 52 and 54, respectively, to prevent disconnection of interlock connection 18.

Figure 4:
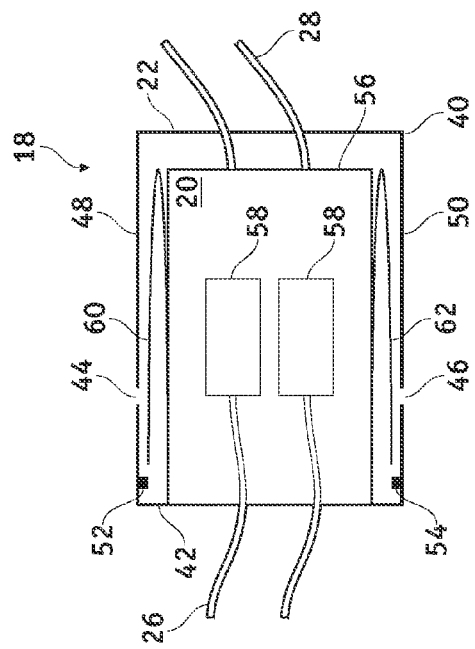
FIGS. 4, 5, and 6 are cross-sectional views of the interlock connection shown in FIG. 2 taken along line 2-2 illustrating one manner in which the male portion may be disconnected from the female portion.
Figure 6:
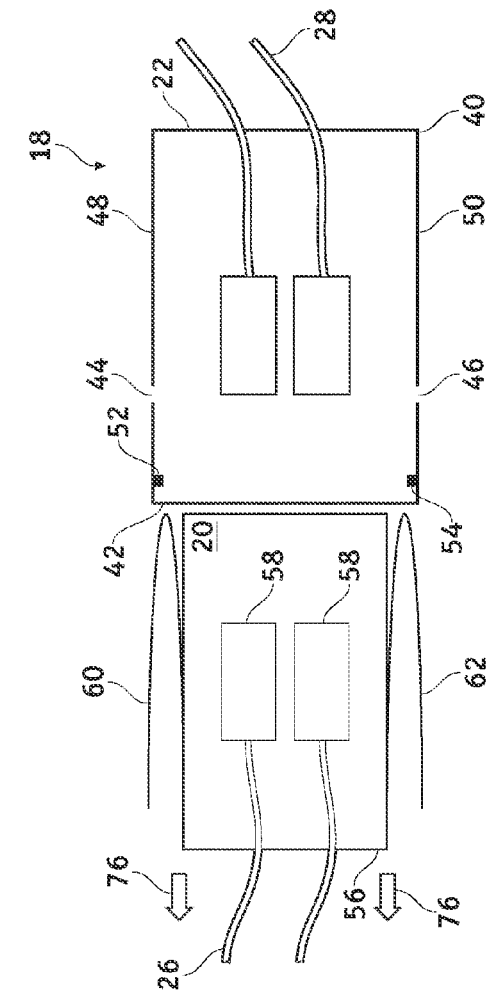
Figure 5:
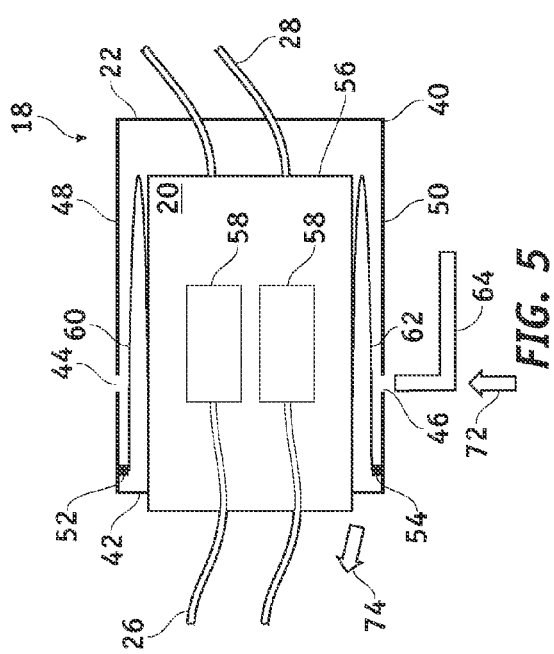

FIGS. 4-6 are cross-sectional views of interlock connection 18 illustrating one manner in which connection 18 may be disconnected by a technician utilizing a disconnection tool 64 (FIGS. 4 and 5). Disconnection tool 64 is illustrated as an L-shaped body having an elongated handle portion; however, it should be appreciated that tool 64 may comprise any body suitable for insertion into access holes 44 and 46. Disconnection tool 64 may be specialized for use in disconnecting interlock connection 18. Alternatively, tool 64 may comprise a tool generally suited for other applications, such as a screw driver, Allen wrench, or the like. For convenience, tool 64 may be removably secured to cover 24 (FIGS. 1 and 2).

Disconnection tool 64 includes a head portion adapted to be inserted into access holes 44 and 46, which provide access to spring clips 60 and 62, respectively, when male portion 20 is received within female portion 22. To this end, access holes 44 and 46 each have a diameter large enough to permit insertion of tool 64; however, the diameters of access holes 44 and 46 are preferably small enough to prevent a technician (or other person) from reaching spring clips 60 and 62 with his or her finger. After moving cover 24 to an open position (FIG. 2), the head portion of disconnection tool 64 is inserted into access hole 44 as indicated in FIG. 4 by arrow 66. Tool 64 engages spring clip 60 and deforms spring clip 60 (e.g., compresses spring clip 60 toward housing 56 of male portion 20). At the same time, male portion 20 may be pulled or twisted away from female portion 22 as indicated by arrow 68. These two movements permit the edge of spring clip 60 to move past retention feature 52 as shown in FIG. 4 at 70.

Referring now to FIG. 5, tool 64 may next be inserted into access hole 46 in the manner indicated by arrow 72. This deforms spring clip 62 (e.g., compresses spring clip 62 toward housing 56 of male portion 28) and thereby permits spring clip 62 to move past retention feature 54 as male portion 20 is pulled or twisted away from female portion 22 (indicated by arrow 74). After this step has been completed, spring clips 60 and 62 no longer abuttingly engage retaining respective features 52 and 54; thus, interlock connection 18 may now be disconnected by simply pulling male portion 20 away from female portion 22 as indicated in FIG. 6 by arrows 76.

It should thus be appreciated that multiple steps must be performed to disconnect interlock connection 18 after cover 24 (FIGS. 1 and 2) has been moved to an open position and the discharge of high voltage power source 12 (FIG. 1) has been initiated. As a result, a technician must spend a period of time (e.g., several seconds) performing the steps described above to disconnect male portion 20 from female portion 22. This permits high voltage power source 12 to disconnect and/or discharge before the technician may come into physical contact with the terminals contained within interlock connection 18.

After servicing, interlock connection 18 may be reconnected by simply plugging male portion 20 into female portion 22. When male portion 20 is first inserted into open end 42 of female portion 22, spring clips 60 and 62 are compressed against housing 56 of male portion 20 by retention features 52 and 54, respectively. When male portion 20 is fully plugged into female portion 22 such that terminals 58 contact the terminals carried by female portion 22, spring clips 60 and 62 move past retention features 52 and 54 and, consequently, expand within female portion 22 to return to the position shown in FIG. 3. Therefore, in contrast to interlock connections employing conventional threaded fasteners of the type described above, interlock connection 18 requires that a technician reinstall or reset the time-delay feature to reconnect the connection's terminals.

Although an exemplary embodiment of interlock connection 18 has been described above as employing spring clips to retain male portion 20 within female portion 22, it should be understood that many other suitable resilient retentions means may be utilized. For example, in certain embodiments, housing 56 may be formed from a pliable material that may be compressed when male portion 20 is inserted into female portion 22. Alternatively, the resilient retention member may take the form of a spring-biased device, such as a ball plunger, that may be moved between a retracted and an extended position. Furthermore, while the interlock connection has been described above as employing two time-delay features (i.e., resilient members 60 and 62, retention features 52 and 54, and access holes 44 and 46), other embodiments of the inventive interlock connection may employ any number of time-delay features suitable for preventing the disconnection of interlock connection 18 for a time period sufficient to permit high voltage power source 12 to be sufficiently discharged.

In view of the above, it should be appreciated that a high voltage connection system employing a time-delay feature has been provided that prevents access to the interlock connection terminals until the high voltage power source is substantially discharged. It should further be appreciated that the high voltage connection system requires reinstallation of the time-delay feature to reconnect the interlock connection. Although exemplary embodiments of the high voltage connection system have been discussed above in the vehicular context, it should be appreciated that other embodiments of the high voltage connection system may be employed in any context wherein it is desirable to provide electrical access protection. Furthermore, as used herein the term "high voltage" is intended in its broadest sense and includes any voltage at which access protection may be desirable (e.g., for DC, approximately 30 volts and higher; for AC, approximately 15 volts and higher).

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. An interlock connection for use in conjunction with a high voltage electrical system, the interlock connection configured to be disconnected with a disconnection tool, the interlock connection comprising:
   a male portion;
   a female portion adapted to receive the male portion therein, the female portion including an access hole; and
   a resilient member coupled to the male portion and accessible through the access hole when the male portion is received by the female portion, the resilient member configured to engage the female portion to prevent disconnection of the male portion from the female portion until the resilient member;
   wherein the resilient member is fully contained within the female portion when the male portion is received by the female portion, and wherein the resilient member is configured to be compressed toward the male portion when the disconnection tool is inserted into the female portion through the access hole.

2. An interlock connection according to claim 1 wherein the female portion comprises:
   a housing having an inner surface and an outer surface, the access hole extending from the inner surface to the outer surface; and
   a retention feature disposed on the inner surface.

3. An interlock connection according to claim 2 wherein the resilient member is configured to abuttingly engage the retention feature to prevent the disconnection of the male portion from the female portion.

4. An interlock connection according to claim 2 wherein the retention feature resides proximate the access hole.

5. An interlock connection according to claim 1 wherein the resilient member comprises at least one spring clip.

6. An interlock connection according to claim 5 wherein the male portion includes a first wall and a second wall, and wherein the at least one spring clip comprises:
   a first spring clip fixedly coupled to the first wall; and
   a second spring clip fixedly coupled to the second wall.

7. An interlock connection according to claim 6 wherein the first wall is substantially opposite the second wall.

8. An interlock connection according to claim 1 further comprising a cover slidably coupled to the female portion, the cover configured to block the access hole when the cover is in a closed position.

9. An interlock connection according to claim 8 further comprising a high voltage interlock circuit coupled to the cover and configured to detect when the cover is moved from the closed position.

10. An interlock connection according to claim 9 wherein the high voltage interlock circuit comprises:
    a terminal mounted on the male portion; and
    a shorting plug mounted on the cover, the shorting plug engaging the terminal when the cover is in the closed position.

11. An interlock connection for use in conjunction with a high voltage electrical system, the interlock connection configured to be disconnected with a disconnection tool, comprising:
    a female portion, comprising:
       a housing having a cavity therein;
       first and second access holes through the housing; and
       first and second projections disposed on the housing and extending into the cavity proximate the first and second access holes, respectively;
    a male portion adapted to be received by the cavity; and
    a resilient member mounted on the male portion the resilient member abuttingly engaging the projection to retain the male portion within the cavity until the disconnection tool is inserted into the access hole to deform the resilient member.

12. An interlock connection according to claim 11 wherein the housing includes an open end through which the male portion is received, the projection disposed proximate the open end.

13. An interlock connection according to claim 11 comprising first and second resilient members mounted on the male portion.

14. An interlock connection according to claim 13 wherein the first and second resilient members are accessible through the first and second access holes, respectively, when the male portion is retained within the cavity.

15. A high voltage connection system for use onboard a vehicle including a high voltage power source and a high voltage device, the high voltage connection system comprising:
- an interlock connection configured to couple the high voltage power source to the high voltage device, the interlock connection comprising:
  - a female portion having an access hole therein;
  - a male portion adapted to be inserted into the female portion; and
  - a resilient member coupled to the male portion and abuttingly engaging an inner surface of the female portion to retain the male portion within the female portion until the resilient member is deformed, the resilient member configured to be accessible through the access hole;
- a high voltage interlock circuit coupled to the interlock connection, the high voltage interlock circuit configured to initiate discharge of the high voltage power source when access to the interlock connection is detected; and
- a cover movably coupled to the interlock connection, the cover obstructing the access hole when in a closed position.

16. A high voltage connection system according to claim 15 wherein the cover is slidably coupled to the female portion.

17. A high voltage connection system according to claim 15 wherein the high voltage interlock circuit is coupled to the cover and configured to initiate discharge of the high voltage power source when the cover is moved from the closed position.

18. A high voltage connection system according to claim 15 wherein the resilient member comprises a spring clip.

* * * * *